US012695389B2

(12) United States Patent
Baretich

(10) Patent No.: US 12,695,389 B2
(45) Date of Patent: Jul. 28, 2026

(54) FLYBACK CONVERTER WITH IMPROVED RESPONSE

(71) Applicant: Next Generation Power, Inc., Portland, OR (US)

(72) Inventor: David Baretich, Aurora, OR (US)

(73) Assignee: Next Generation Power, Inc., Portland, OR (US)

( * ) Notice: Subject to any disclaimer, the term of this patent is extended or adjusted under 35 U.S.C. 154(b) by 107 days.

(21) Appl. No.: 18/469,148

(22) Filed: Sep. 18, 2023

(65) Prior Publication Data

US 2025/0096694 A1      Mar. 20, 2025

(51) Int. Cl.
H02M 3/335 (2006.01)
H02M 1/34 (2007.01)
H02M 3/158 (2006.01)
H02M 1/00 (2006.01)

(52) U.S. Cl.
CPC ....... H02M 3/33576 (2013.01); H02M 1/348 (2021.05); H02M 3/1586 (2021.05); H02M 3/33569 (2013.01); H02M 3/33592 (2013.01); H02M 1/0048 (2021.05)

(58) Field of Classification Search
CPC ............. H02M 3/33576; H02M 1/348; H02M 3/1586; H02M 3/33569; H02M 3/33592; H02M 1/0048
See application file for complete search history.

(56) References Cited

U.S. PATENT DOCUMENTS

| | | | | | |
|---|---|---|---|---|---|
| 5,430,633 | A | * | 7/1995 | Smith | H02M 3/33569 |
| | | | | | 363/20 |
| 5,434,768 | A | * | 7/1995 | Jitaru | H02M 3/33569 |
| | | | | | 363/21.01 |
| 6,191,960 | B1 | * | 2/2001 | Fraidlin | H02M 3/33576 |
| | | | | | 363/90 |
| 6,552,917 | B1 | * | 4/2003 | Bourdillon | H02M 3/33561 |
| | | | | | 363/21.12 |

(Continued)

FOREIGN PATENT DOCUMENTS

| | | |
|---|---|---|
| CN | 116418236 A | 7/2023 |
| KR | 101270326 B1 | 5/2013 |

OTHER PUBLICATIONS

International Search Report and Written Opinion of the International Searching Authority from the European Patent Office, in PCT/US2024/047306 dated Dec. 16, 2024, which is a related application.

(Continued)

*Primary Examiner* — Yusef A Ahmed
(74) *Attorney, Agent, or Firm* — Kolitch Romano Dascenzo Gates LLP

(57) ABSTRACT
A flyback converter is described, configured to operate in a continuous mode with two primary side switches and one secondary side switch, wherein operation contains three switch states; a Primary state wherein both primary side switches are on and current increases in a transformer primary, a Circulate state wherein only one primary switch is on and current circulates in the transformer primary, and a Secondary state wherein both primary switches are off, the secondary side switch is on, and current flows from a transformer secondary into an output of the converter.

15 Claims, 10 Drawing Sheets

100

(56) References Cited

U.S. PATENT DOCUMENTS

| 8,670,247 | B2 * | 3/2014 | Mase | H02M 1/36 |
| | | | | 363/21.04 |
| 12,051,967 | B2 * | 7/2024 | Probst | H02M 1/34 |
| 2015/0124495 | A1 * | 5/2015 | Kong | H02M 3/33592 |
| | | | | 363/21.14 |
| 2019/0036442 | A1 * | 1/2019 | Oh | H02M 3/33592 |
| 2019/0356232 | A1 * | 11/2019 | Song | H02M 1/08 |
| 2022/0416652 | A1 * | 12/2022 | Huang | H02M 1/348 |
| 2023/0387815 | A1 * | 11/2023 | Wu | H02M 3/3353 |
| 2024/0348175 | A1 * | 10/2024 | Ni | H02M 1/348 |

OTHER PUBLICATIONS

Song, Chengbao, et al.; "Study on forward continuous operation characteristics of bidirectional double transistor flyback converter"; IEEE Asia Converence on Power and Electrical Engineering; 2022.
Su, Bin, et al.; "Soft-switching dual forward DC/DC Converters Employing Secondary Side Control", IEEE Energy Conversion Congress and Exposition, 2009.
Wang, Guan-shium, et al.; "Interleaved Flyback Converter with GaN Power Devices", IEEE International Power Electronics and Application Conference and Exposition, 2018.
Wang, J.B., et al.; "A study of the interleaved buck derived converters", IEEE International Conference on Industrial Technology, 2006.
Wei, Yingdong, et al.; "Wide Range Dual Switch Forward-Flyback Converter with Symmetrical RCD Clamp", Power Electronics Specialists Converence, 2005.

* cited by examiner

--PRIOR ART--

--PRIOR ART--

| STATE | Q1 | Q2 | Q3 |
|-------|----|----|----|
| $T_{PRI}$ | 1 | 1 | 0 |
| $T_{CIR}$ | 0 | 1 | 0 |
| $T_{SEC}$ | 0 | 0 | 1 |

FIG. 4

FLYBACK CONVERTER WITH IMPROVED RESPONSE

FIELD

This disclosure relates to systems and methods for electrical power supplies. More specifically, the disclosed embodiments relate to flyback converters.

INTRODUCTION

Flyback power converters are ubiquitous in power converter applications due to their simplicity of construction, low parts count, and low cost. However, they typically are limited to lower power levels and lower output currents. Achieving higher power levels is not difficult but achieving high output current levels can be a challenge due to high peak and RMS currents in the transformer secondary and output filter. Interleaving multiple phases has brought some improvement, such as in offline power factor correction (PFC) converters. However, as flyback converter output current pulses vary in duration and amplitude, reduction in output filtering requirements is limited.

SUMMARY

The present disclosure provides systems, apparatuses, and methods relating to flyback converters.

In some examples, an electronic circuit includes: a flyback converter configured to operate in a continuous mode, the flyback converter including: a coupled inductor having a primary winding and a secondary winding; a first switch having a first input terminal, a first output terminal, and a first control terminal, wherein the first input terminal is coupled to a voltage input terminal and the first output terminal is coupled to a first end of the primary winding; a second switch having a second input terminal, a second output terminal, and a second control terminal, wherein the second input terminal is coupled to a second end of the primary winding; and a third switch having a third input terminal, a third output terminal, and a third control terminal, wherein the third input terminal is coupled to a first end of the secondary winding.

In some examples, a continuous-mode flyback converter includes: a transformer having a primary winding and a secondary winding; a first switch having a first input terminal, a first output terminal, and a first control terminal, wherein the first input terminal is coupled to a voltage input terminal and the first output terminal is coupled to a first end of the primary winding; a second switch having a second input terminal, a second output terminal, and a second control terminal, wherein the second input terminal is coupled to a second end of the primary winding; and a third switch having a third input terminal, a third output terminal, and a third control terminal, wherein the third input terminal is coupled to a first end of the secondary winding.

In some examples, a method for converting a DC input voltage to a DC output voltage includes: transitioning a continuous-mode flyback converter between three different switch states, wherein the flyback converter includes a transformer, two primary side switches, and one secondary side switch, and the three switch states include: a primary state wherein the two primary side switches are on and current increases in a primary side of the transformer; a circulate state wherein only one of the two primary switches is on and current circulates in the primary of the transformer; and a secondary state wherein both primary switches are off, the secondary side switch is on, and current flows from a transformer secondary into an output of the converter.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is a table depicting switch control states of the flyback converter of FIG. 3 during various operating states.

DETAILED DESCRIPTION

Figure 1:
FIG. 1 is a schematic diagram depicting an isolated two-switch flyback converter.
Figure 1:
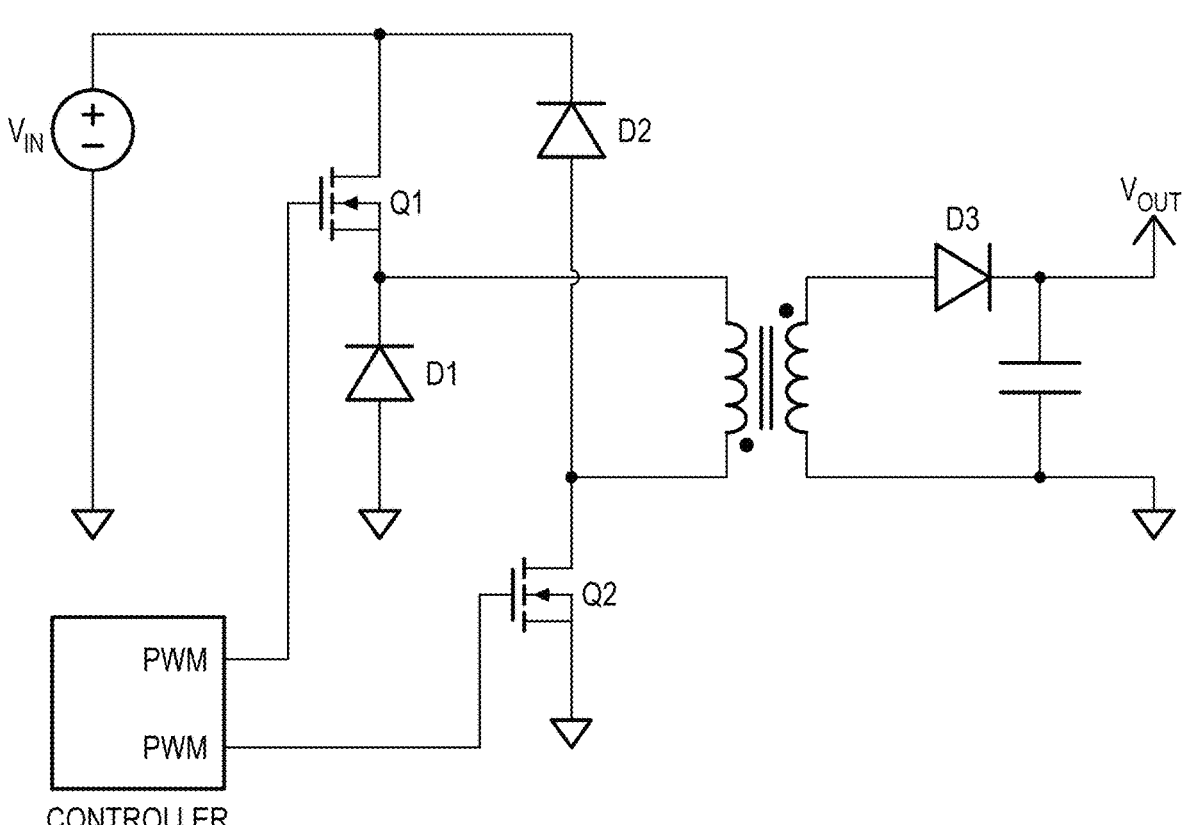

Various aspects and examples of an improved flyback converter are described below and illustrated in the associated drawings. Unless otherwise specified, a flyback converter in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, flyback converters employing two separately controlled primary switches are described. Flyback converters described herein include more consistent transfer functions, elimination of the right-half-plane (RHP) zero, reduced phase delay, and improved transient response. Applications of the presently disclosed converters include typical flyback applications as well as applications requiring high and/or highly dynamic output current. Furthermore, flyback converters described herein provide unique benefits to data centers and similar applications.

Global data centers were estimated to consume 205 terawatt-hours in 2018, equivalent to 1% of global electricity use. Flyback converters taught herein can contribute to efforts to increase data center efficiency and reduce power consumption while optimizing total operating costs. More specifically, one area for improvement is power distribution and delivery within the data center. While 380 VDC distribution has improved distribution efficiency, it requires multiple conversion steps, such as 48V, 12V, or other intermediate bus voltages, to arrive at the single or sub-volt level utilized by typical large digital ICs.

Converting 380 VDC to 1 VDC is typically a three-step process, while 48 VDC to 1 VDC is typically a two-step process. Each conversion step reduces system efficiency, increasing system cost as well as energy costs. Accordingly, flyback converters of the present disclosure utilize an improved flyback topology and can implement either 380 VDC or 48 VDC (or another desired input voltage) to single and sub-one-volt levels in a single conversion step. Furthermore, the efficiency of the improved flyback converters taught herein can be higher than the cascaded overall efficiency of multiple series converters.

For high current and high dynamic current output requirements, flyback converters of the prior art have remained suboptimum. High current applications employing flyback converters typically require large amounts of output capacitance and high RMS current capacity in the output filter. For example, in a discontinuous output flyback converter operating at 50% duty cycle, peak output current is approximately four times the average DC output current. RMS current in the output capacitors approaches 1.3 times the average DC output current. This adds size, heat, and cost to the converter.

A continuous flyback converter can reduce this requirement to peak currents of roughly two times the average output current, with RMS current roughly the same as the output current. However, this can still be cost prohibitive for output currents several tens of amperes or higher.

Regarding dynamic current requirements, both existing continuous and discontinuous converter modes have challenges due to inherent limitations in their control functions. First, discontinuous converters have a single pole response to control changes, in either voltage mode or current mode. However, both are equally nonlinear due to power throughput varying with the square of the primary current. For example, doubling the duty cycle of a voltage mode discontinuous converter doubles the amplitude of magnetizing current into the transformer primary, but quadruples the power throughput and hence, the output current. Likewise in a peak current mode discontinuous converter, doubling the program peak primary current also quadruples the power and output current. This makes transient response a challenge because a loop that is optimized for stability at full load will have lower bandwidth and slower response at lighter loads. Optimizing at lighter loads may result in instability at full load.

Second, continuous mode flyback converters have their own distinct limitations. For voltage mode converters, output gain of $D/(1-D)$ means that gain varies with duty cycle. Next, a varying $1-D$ also causes a shift in the output frequency response which is double pole in nature. Finally, a right half plane (RHP) zero exists in the transfer function, limiting loop bandwidth. For all these reasons, voltage mode is not commonly used in continuous flyback converters. Peak current mode control helps loop compensation in that response is single pole so the loop can move more easily between continuous and discontinuous operation. However, there is still a varying output gain due to a varying 1–D, as well as a RHP zero in the transfer function. As a result, current mode continuous flyback converters are still limited in their control bandwidth, in turn limiting their ability to respond to high dynamic applications.

Because of this, high current and high dynamic current requirements are typically provided by forward mode converters such as buck converters, half bridge, full bridge, forward, etc. However, isolated versions of these converters typically require two magnetic components (separate power transformer and output filter), versus the single transformer of a flyback converter. They also require at least two output rectifiers (synchronous or discrete), versus a single rectifier for a flyback. Accordingly, for simplicity, low cost, and small size, a flyback converter can be a preferred solution if its shortcomings are addressed.

Flyback converters of the present disclosure are configured to resolve these issues, and can provide both high output currents and high dynamic output currents.

EXAMPLES, COMPONENTS, AND ALTERNATIVES

The following sections describe selected aspects of illustrative flyback converters as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Flyback Converter

As shown in FIGS. 3-10, this section describes an illustrative flyback converter 100. Flyback converter 100 is an example of the improved flyback converters described above.

Figure 2:
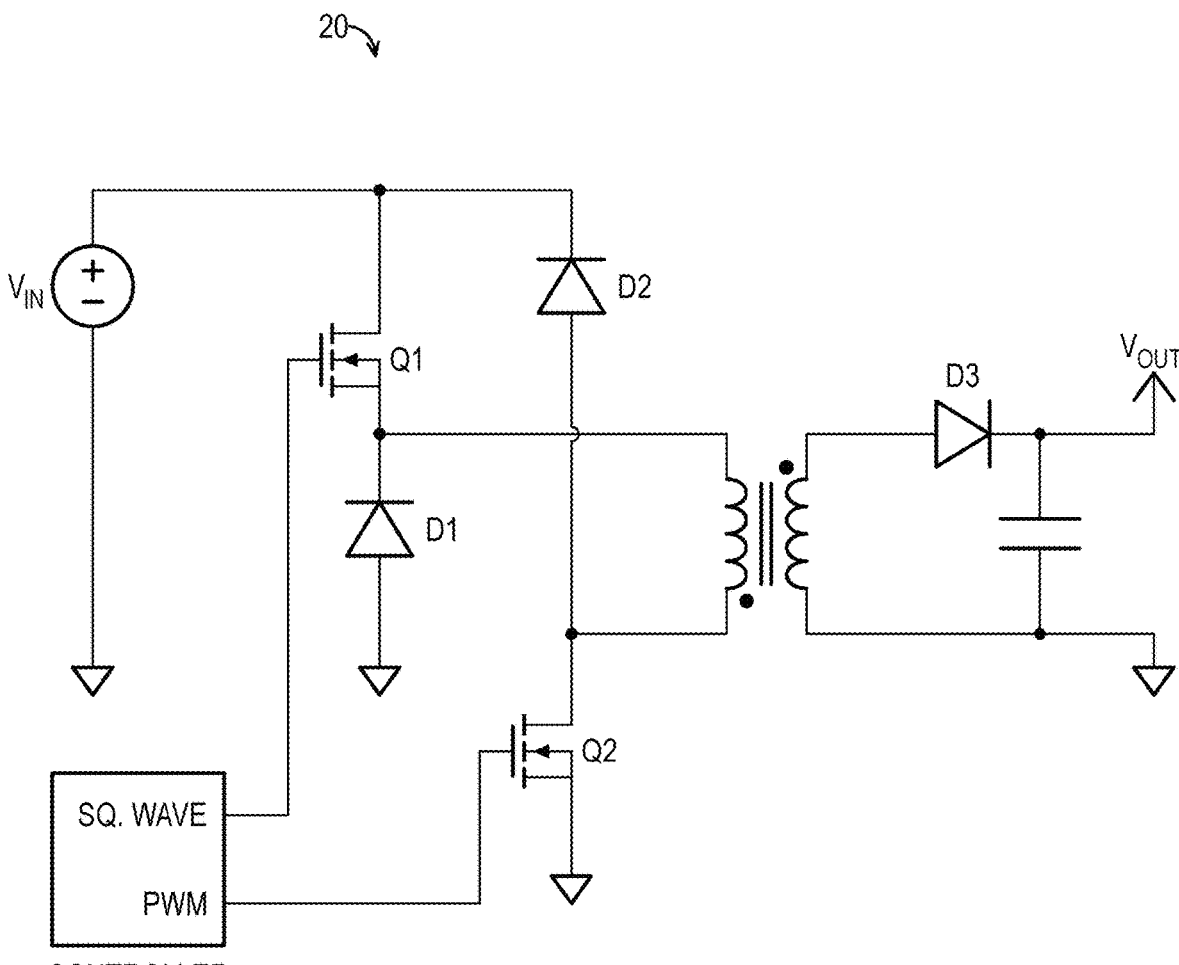
FIG. 2 is a schematic diagram depicting an isolated two-switch flyback converter with separate control.

FIGS. 1 and 2 depict known flyback converters. FIG. 1 shows an isolated two-switch flyback converter 10 and FIG. 2 shows an isolated two-switch flyback converter 20 with separate control for each switch. In each case, both switches turn on at substantially the same time. In the example depicted in FIG. 2, Q1 is controlled by a fixed square wave and Q2 is controlled by a PWM controller. Flyback converter 20 operates in a discontinuous mode as magnetizing current returns to zero before the start of the next switching cycle. Accordingly, when working at a fixed output operating voltage, the output current of converter 20 is proportional to the square of the duty cycle D.

Referring to FIG. 1, known flyback converters such as converter 10 operating in continuous mode divide the switching cycle into two parts, e.g., phases or states. The first part is the $T_{pri}$ portion (in which duty cycle D is multiplied by the switching period), modulated by a controller with variable pulse width capability. During the $T_{pri}$ portion, both primary MOSFETs are on and current ramps in the primary of the transformer. The second part of the switching cycle is the $T_{sec}$ portion (1-D multiplied by the switching period), where primary MOSFETs are turned off. Current flows through the transformer secondary and rectifier into the output.

For a 1:1 transformer ratio:

$$V_{out} = V_{in} * D/(1-D)$$

where $V_{in}$ is the input voltage, Vout is the output voltage, and D is the duty cycle.

A significant control limitation of converter 10 is that the term 1-D varies in the opposite direction of D, i.e., inversely. Because of this, when D is increased, such as in response to a fast load increase, in order to increase transformer current, 1-D is reduced temporarily. Since the average output current in a continuous flyback converter is approximately proportional to 1-D, the output current decreases temporarily in response to an increase in D. In the converter control transfer function, this is manifested as a right half plane (RHP) zero, in which the amplitude increases with frequency while the phase lags. This behavior cannot be directly compensated for, so known methods to maintain stability include limiting loop bandwidth to below the RHP zero frequency, typically set at less than $\frac{1}{5}^{th}$ of the lowest RHP zero point.

Figure 3:
FIG. 3 is a schematic diagram depicting an illustrative flyback converter in accordance with aspects of the present disclosure.
Figure 3:
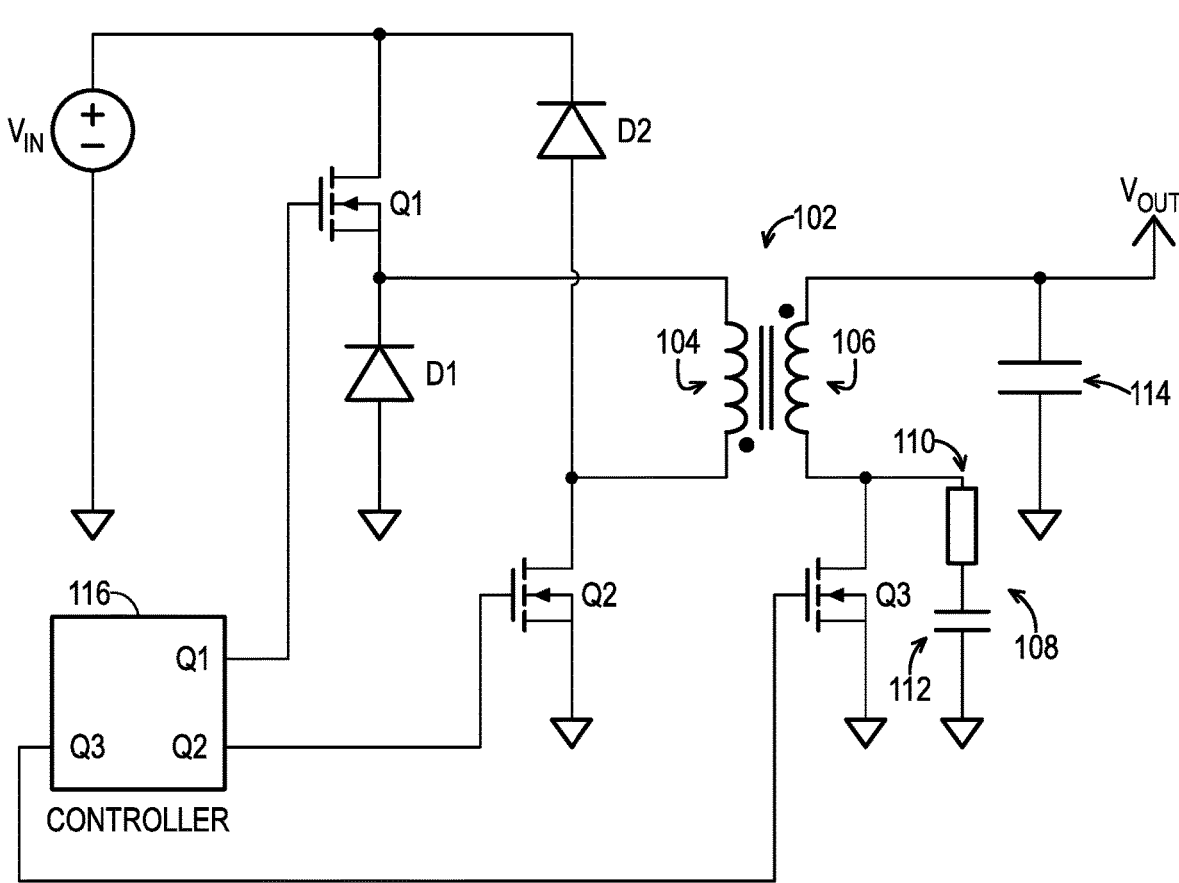

FIG. 3 depicts improved flyback converter 100, a two-switch isolated flyback converter operating in continuous mode. Flyback converter 100 includes a transformer 102 comprising a coupled inductor having a primary winding 104 and a secondary winding 106, configured such that there is always magnetizing current flowing in either primary winding 104 or secondary winding 106.

On the primary winding side, flyback converter 100 includes two controllable switches, Q1 and Q2. In some examples, Q1 and/or Q2 comprise metal-oxide-semiconductor field-effect transistors (MOSFETs), e.g., comprising silicon, silicon carbide, or gallium nitride materials. In some examples, Q1 and/or Q2 comprise insulated gate bipolar transistors (IGBTs) and/or bipolar junction transistors (BJTs), depending on the application and operating frequency. Additionally, a rectifier diode D1 is disposed in series with Q1 and a snubber diode D2 is disposed in parallel with primary winding 104 to reduce ringing on the primary winding.

On the secondary winding side, flyback converter 100 includes a single controllable switch Q3, also referred to as an output rectifier. Output rectifier Q3 may comprise a MOSFET, e.g., comprising silicon, silicon carbide, or gallium nitride materials, controlled synchronously. Alternatively, in some examples, Q3 may comprise a diode controlled asynchronously, such as a silicon PN diode, silicon Schottky diode, silicon carbide diode, silicon carbide Schottky diode, gallium nitride (GaN) diode, or other appropriate diode. An RC snubber 108 comprising a resistor 110 and a capacitor 112 (AKA capacitor $C_{sn}$) is disposed across the output winding to reduce ringing on output rectifier Q3. Additionally, an output capacitor 114 is provided across the output to provide charge for the load.

Due to the three-switch arrangement of flyback converter 100, the switching cycle of the converter is divided into three states, namely, a Primary state, a Circulation state (also referred to as a Circulate state), and a Secondary state, see FIG. 4, each of the three states corresponding to a unique combination of states of the three switches as controlled by a controller 116.

The Primary state, defined within a switching cycle as $T_{pri}$, comprises the state in which both Q1 and Q2 are closed (i.e., one) and Q3 is open (i.e., zero). In the primary state, current increases in primary winding 104 of transformer 102. For DC gain and AC transfer function purposes, $D_{pri}$ is the ratio of $T_{pri}/T_{per}$, where $T_{per}$ is the time period of the complete switching cycle.

The Circulation state, defined within a switching cycle as $T_{cir}$, comprises the state in which only one primary switch is on. For example, the Circulation state may include Q1 being open (i.e., zero) while Q2 remains closed (i.e., one)

and Q3 remains open (i.e., zero). In some examples, the Circulation state may instead have Q1 closed (i.e., one) and Q2 open (i.e., zero) while Q3 remains open (i.e., zero). During $T_{cir}$, primary current circulates through the primary winding side of the converter with only resistive losses from the primary winding and conduction losses, e.g., from D1 and Q2.

The Secondary state, defined within a switching cycle as $T_{sec}$, comprises the state in which both Q1 and Q2 are open (i.e., zero), and Q3 is closed (i.e., one), such that current transfers to the secondary output. For DC gain and AC transfer function purposes, $D_{sec}$ refers to the ratio of $T_{sec}/T_{per}$, where $T_{per}$ is the time period of the complete switching cycle.

Notably, these states may be arranged in different orders and/or broken up into multiple substates if useful for a particular application. For example, it may be desirable to split $T_{cir}$ into more than one substates. Additionally, or alternatively, $T_{sec}$ may be separately modulated from $T_{pri}$ depending on application. Examples of different orderings and substate partitioning are described in more depth below.

In a first example, assume $D_{pri}$ is proportional to the Primary state time, $D_{sec}$ is proportional to the Secondary state time, and $D_{cir}$ is proportional to the Circulating state time. In this case, the gain equation is:

$$V_{out} = V_{in} * \left( D_{pri}/D_{sec} \right).$$

In another example, if $D_{sec}$ is fixed, then Vout is proportional to $D_{pri}$ and $V_{in}$. $D_{sec}$ may be fixed over a range of desired values, depending on the application, or varied across the same range.

A unique aspect of this control method is that it results in an output voltage proportional to $D_{pri}/D_{sec}$, rather than $D/(1–D)$ (as described above with respect to the prior art converters). In other words, the control method of flyback converter 100 eliminates the 1–D term and thereby eliminates the mechanism that produces the RHP zero. That is, an increase in $D_{pri}$ does not result in a decrease in $D_{sec}$, and there is no temporary drop in output current. Because there is no RHP zero to avoid, the loop bandwidth can be greatly increased over existing converters.

This result is valid for both voltage and current mode control methods. DC gain is constant in both methods, proportional to $D_{pri}$. In voltage mode, the output LC frequency is fixed, rather than moving with 1-D per the equation below. For a standard continuous voltage mode flyback converter of the prior art:

$$f_{LC} = (1 - D)/(n * 2\pi * (L_m * C_o) \wedge 0.5)$$

In contrast, for flyback converter 100, this becomes:

$$f_{LC} = D_{sec}/(n * 2\pi * (L_m * C_o) \wedge 0.5)$$

where n is the secondary winding turns ratio and $L_m$ is the magnetizing inductance.

By setting $D_{sec}$ to a fixed value, the loop gain is more consistent across the input line and output load range, thereby enabling better loop optimization.

Figure 5:
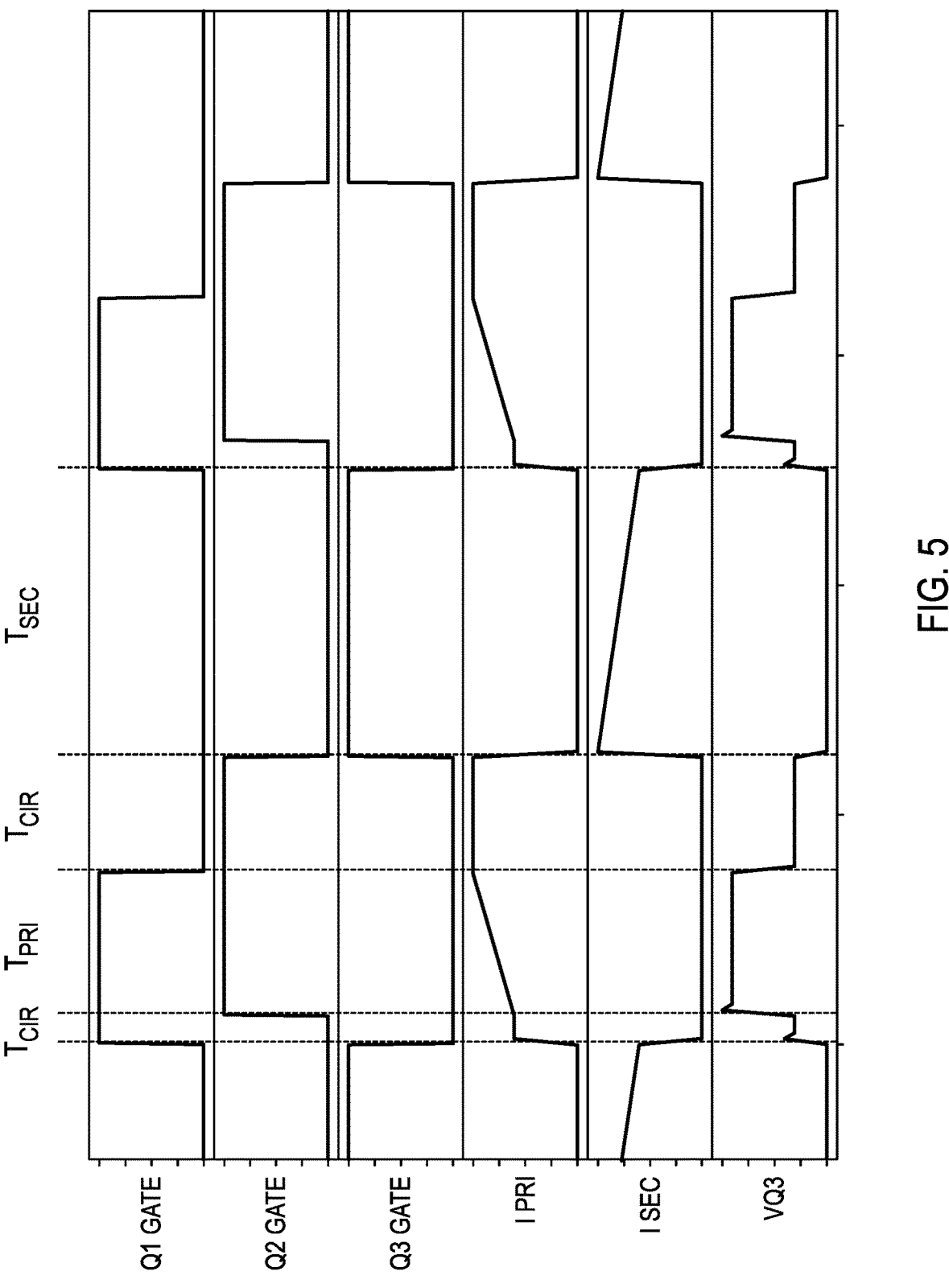
FIG. 5 depicts gate drive, transformer voltage, and current waveforms of a single-phase example of the flyback converter of FIG. 3.

Turning now to FIG. 5, waveforms and timings for an example of flyback converter 100 are shown.

For continuous flyback mode, turning on both Q1 and Q2 simultaneously puts a maximum voltage differential across output rectifier Q3 according to the equation:

$$V_{Q3} = V_{out} + V_{in} * N_{sec}/N_{pri}$$

where $N_{sec}$ is the number of secondary turns and $N_{pri}$ is the number of primary turns in the transformer. RC snubber networks such as RC snubber 108 dissipate power in proportion to the square of the voltage transition across the snubber capacitor $C_{sn}$:

$$P_{sn} = 1/2 * C_{sn} * V_{Q3}^2 * f.$$

If Q1 and Q2 turn-on times are slightly staggered, e.g., by briefly moving to the Circulate state, as shown in FIG. 5, the snubber voltage transition is split into two parts, with each transition having a lower $V^2$ value. Accordingly, total snubber power is reduced, as is peak voltage ring across Q3. Similarly, staggering the turn-off of Q1 and Q2, e.g., by transitioning to $T_{cir}$, reduces snubber loss during this transition.

In some applications it may be advantageous to place most of $T_{cir}$ at the end of the switching cycle after $T_{sec}$. This puts $T_{sec}$ closer in time to the beginning of the switching period, reducing phase delay in the control loop. A second reason is that transformer magnetizing current is reduced during $T_{sec}$, so $T_{cir}$ conduction losses are reduced.

In yet other cases, it is preferable to place $T_{sec}$ first in the cycle. Consider the following high dynamic application:

For maximum load step capability, it can take multiple switching cycles to increase the transformer magnetizing current to sufficiently support high output load levels. If faster response is required, the power transformer primary current $I_{pri}$ may be pre-biased at a higher current than is needed at low loads. Accordingly, a sufficient level of current is always flowing in primary winding 104 of transformer 102 and available to transfer to secondary winding 106.

In this scenario, primary winding 104 is pre-biased to a desired current during $T_{pri}$, using one or more cycles as needed. Furthermore, $T_{pri}$ may be extended as needed during the switching cycle to accomplish this in a shorter number of cycles. $T_{sec}$ remains off and no current flows to the output, until pre-bias current is achieved.

Once pre-bias current is achieved, output current, as well as output voltage, is regulated by varying $T_{sec}$. For maximum current from the pre-biased transformer, $T_{sec}$ is set to its maximum point. For low loads, $T_{cir}$ may be extended and $T_{sec}$ reduced, even to zero pulse width at no load. During that time, current simply recirculates in primary winding 104, kept at a desired level by $T_{pri}$ and current is conducted to the output during $T_{sec}$ as needed.

This arrangement enables converter 100 to be faster than known converters typically used in high dynamic applications, such as multiphase buck regulators that are commonly used. As soon as output current is required, $T_{sec}$ is initiated, providing pre-biased output current in typically tens of nanoseconds, limited mainly by input voltage, output voltage, and transformer leakage inductance. Conversely, output current can be turned off in a similar amount of time, typically less than 100 nanoseconds.

Buck regulators and other forward operating converters (including isolated converters) typically use one or more output inductors to smooth switching pulses before outputting power into the load. The ability to quickly ramp inductor current up and down in response to a load step is limited by the equation:

$$di = V * dt/L$$

where V is determined by regulator input voltage, return voltage, output voltage, and the switching state.

Particularly on load release with low output voltages, inductor current can take up to several microseconds to ramp down to zero current. During this time the output voltage may overshoot its regulation point. A comparison is described in more depth below, with respect to the multi-phase examples.

In pre-biased operation, the quickest response occurs by initiating the switching cycle with $T_{sec}$. This minimizes loop delay and is followed by part of $T_{cir}$, then next by $T_{pri}$ to restore magnetizing current in transformer 102, and finally to $T_{cir}$ until the end of the cycle.

In this case, average output current is defined as:

$$I_{out} = I_{pri} * D_{sec} * N_{pri}/N_{sec}$$

where $I_{pri}$ is the pre-biased magnetizing current in the transformer primary.

Accordingly, average output current is linear with $D_{sec}$, with a single pole response into $C_{out}$.

Figure 6:
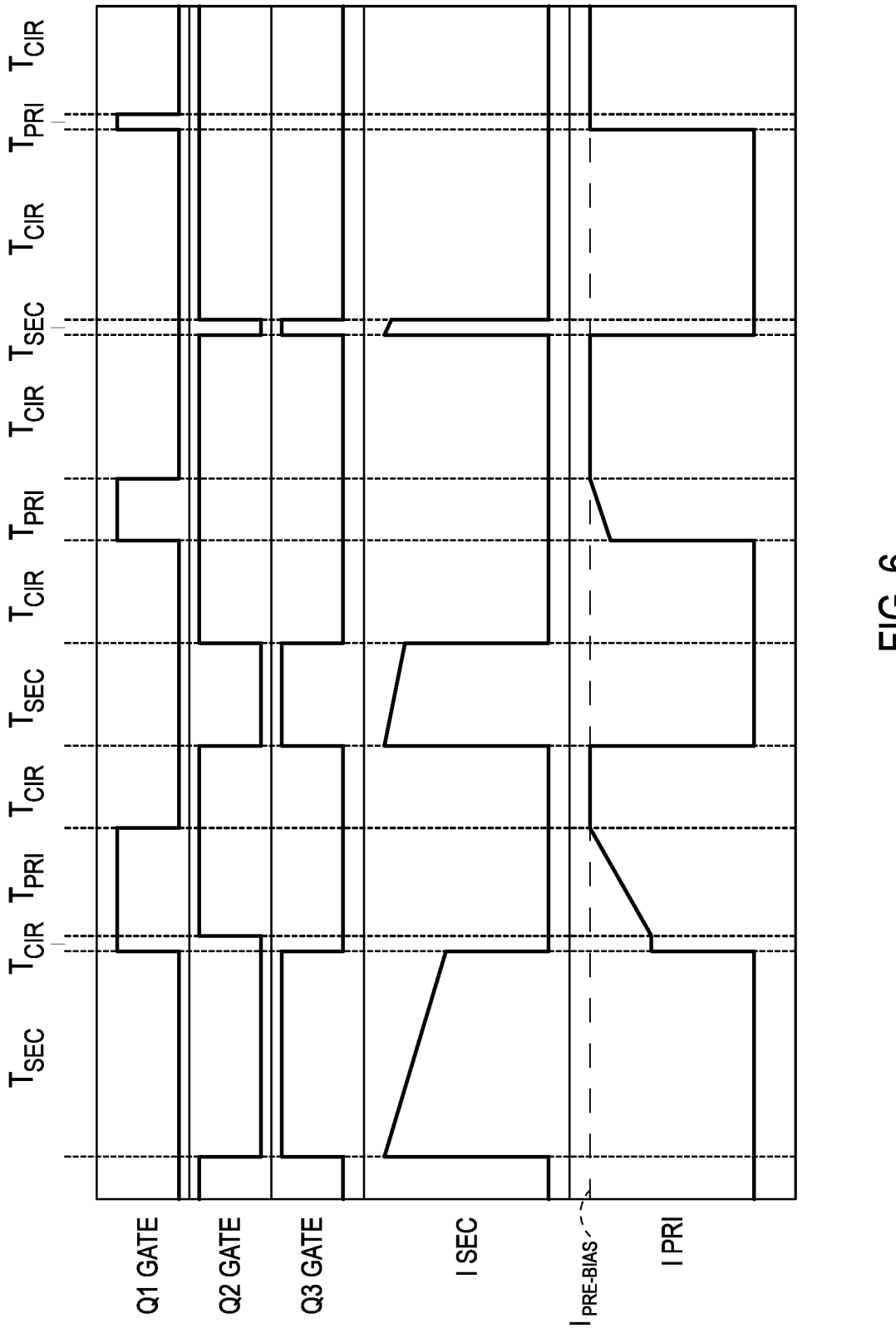
FIG. 6 depicts gate drive and transformer currents for a pre-biased operating mode example of the flyback converter of FIG. 3.

Turning now to FIG. 6, three switching cycles of pre-bias operation of converter 100 is shown. Primary winding current I PRI is shown in the bottom trace, with a dashed line indicating the determined pre-bias current level $I_p$re-bias. Secondary winding current I SEC is shown above it, along with gate signals for Q1, Q2, and Q3, namely Q1 GATE, Q2 GATE, and Q3 GATE, respectively.

The switching cycle begins with Q2 gate shutting off and Q3 turning on, corresponding to a transition from $T_{cir}$ to $T_{sec}$. In response, transformer current shifts to secondary winding 106 and output current flows to the output filter and load. The duration of $T_{sec}$ could be any width or percentage of the switching cycle, as desired in the design, as will be seen by those skilled in the art.

With $T_{sec}$ at its maximum width, maximum average current flows into the output. At the end of $T_{sec}$, a brief period of $T_{cir}$ provides a two-step transition into $T_{pri}$. This period of $T_{cir}$ may be omitted if desired, e.g., by directly transitioning to $T_{pri}$.

During $T_{pri}$, primary winding current I PRI is ramped back to $I_p$re-bias in preparation for the next output cycle. While waiting, converter 100 transitions to the $T_{cir}$ circulate state.

The second $T_{sec}$ pulse width is shorter than the first, corresponding to a proportionally lower average output current. At the end of the secondary pulse, a $T_{cir}$ period is initiated, waiting for the next $T_{pri}$ state.

As shown in FIG. 6, secondary current I SEC decays less in the reduced $T_{sec}$ period, so $T_{pri}$ current begins at a higher value than its previous pulse. Accordingly, $T_{pri}$ requires less time to increase to $I_{pre-bias}$.

The third $T_{sec}$ is even narrower, reducing average output current even more. For zero average current output, this pulse can be eliminated, remaining in an extended $T_{cir}$ until more output current is needed.

Pre-bias values may also be dynamically updated, or changed according to the operational state of the IC load. For example, for a standby or sleep state, pre-bias current $I_{pre-bias}$ may be reduced or even set to zero as desired for more efficient light load operation.

Accordingly, it is anticipated that in some applications, a combination of $D_{pri}$ and $D_{sec}$ modulation may be used, depending on output dynamic requirements. Both single edge and dual edge modulation may be employed as desired.

This high dynamic capability combined with modulation flexibility is particularly advantageous when driving large digital integrated circuits (ICs) such as processors, graphics processing units (GPUs), field programmable gate arrays (FPGAs), central processing units (CPUs), data processing units (DPUs), and/or other similar devices with high dynamic current requirements and multiple operating states.

Figure 7:
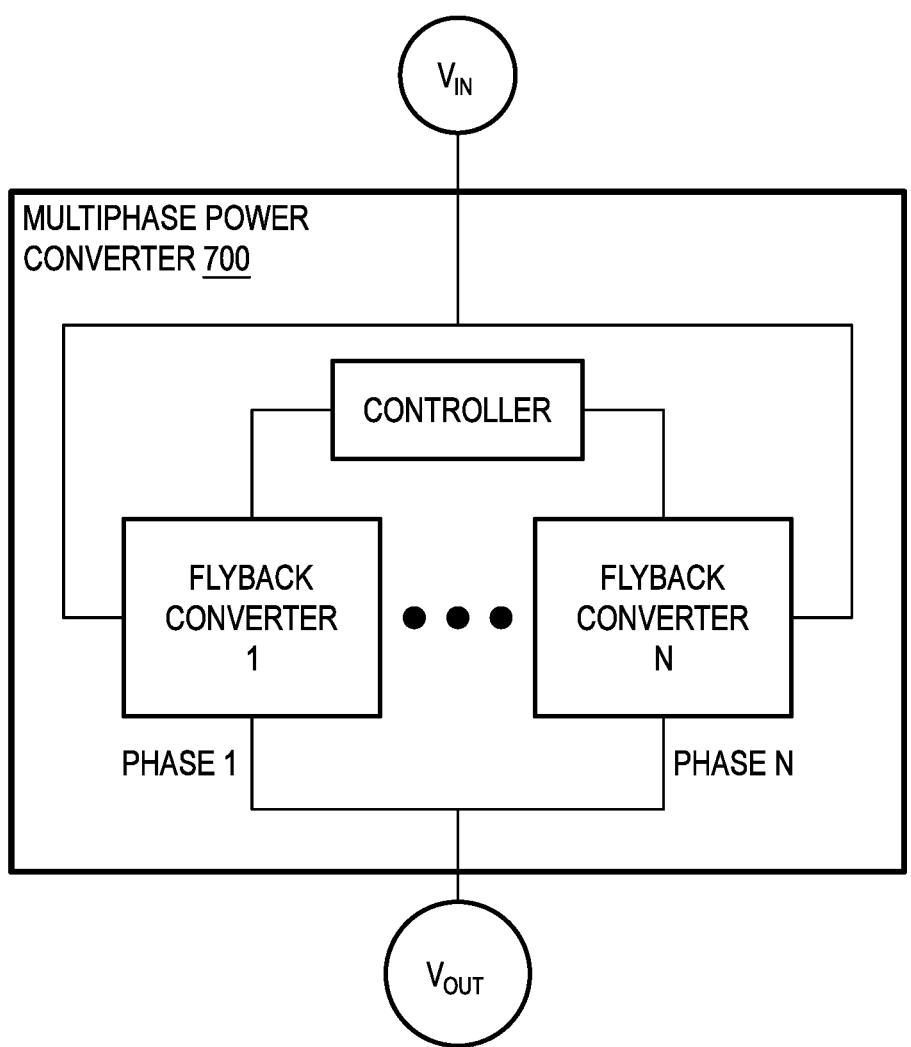
FIG. 7 is a schematic diagram depicting a multiphase power converter utilizing the flyback converter of FIG. 3.

Turning to FIGS. 7-10, interleaved examples are shown, e.g., multiphase applications where $T_{sec}$ times are fixed and interleaved to greatly reduce peak and RMS current in the output filter. As shown in FIG. 7, a multiphase power converter 700 includes a plurality examples of flyback converter 100, labeled 1-N, each flyback converter having an output with a certain phase, labeled Phase 1-Phase N, as described in more depth below.

Figure 8:
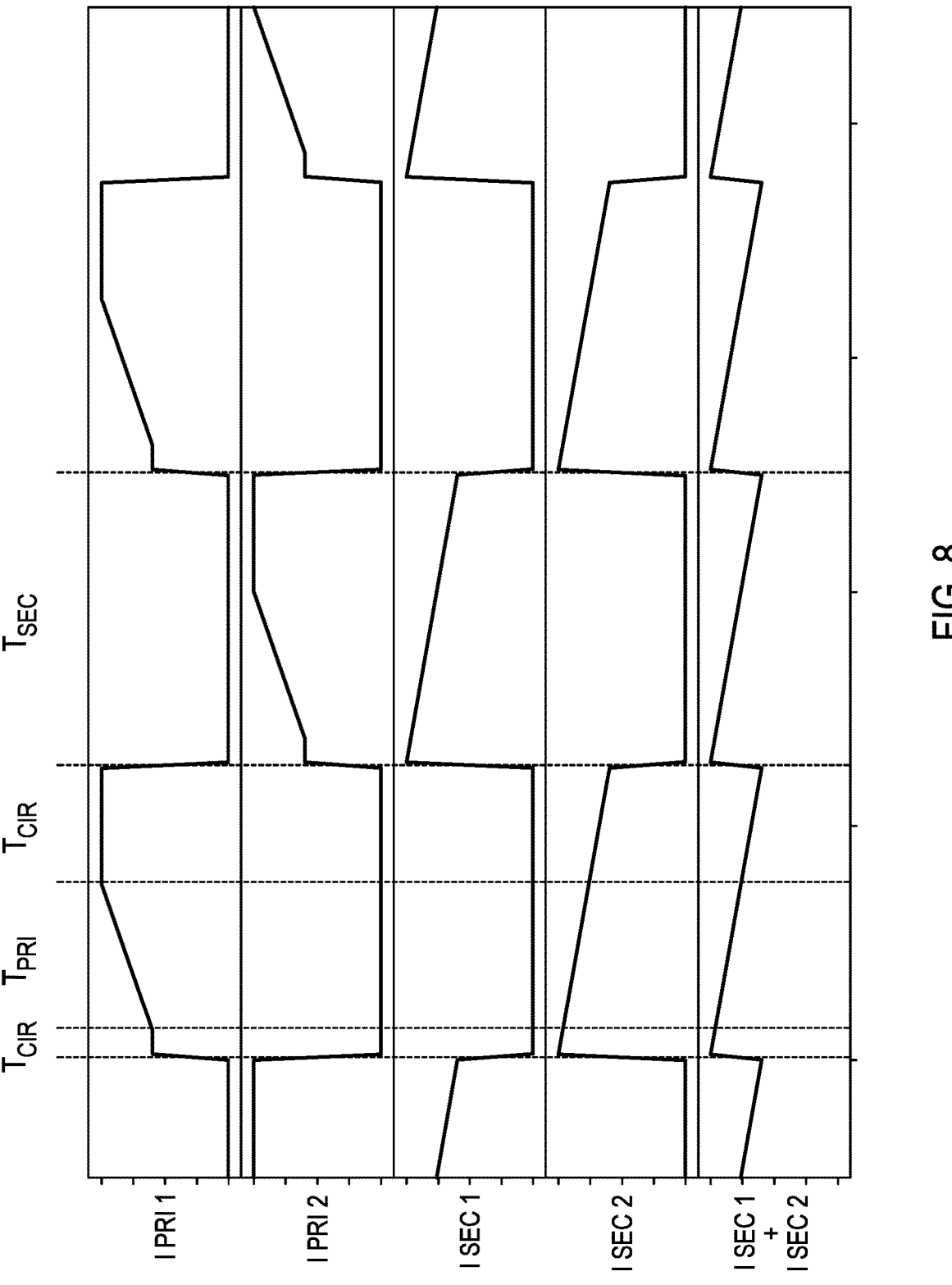
FIG. 8 depicts transformer primary and secondary output currents for a two-phase interleaved example of the multiphase power converter of FIG. 7.

First consider a two-phase interleaved example, in which two examples of converter 100, are utilized in concert, 180° out-of-phase with each other. The two phases of the two-phase interleave example are referred to as Phase 1 and Phase 2. Example waveforms and timings of which is shown in FIG. 8.

Each phase of Phase 1 and Phase 2 has $D_{pri}$ controllable from 0% to 50%, with $D_{pri}+D_{cir}=50\%$. $D_{sec}$ is set at 50%. During the half cycle where Phase 1 is increasing magnetizing current in primary winding 104 of the first converter, i.e., during $T_{pri}$, followed by circulating during $T_{cir}$, Phase 2 is outputting current into the load during its $T_{sec}$. Likewise, during the other half cycle when Phase 2 is increasing magnetizing current in the primary winding of the second converter and circulating, Phase 1 is outputting current into the load during its $T_{sec}$.

While there may be differing rising and falling slopes to the output current waveforms, e.g., due to input voltage, output voltage, magnetizing inductance, and state transition, thereby preventing a perfect transition of output current among phases, the magnitude and RMS values are far less than that of prior art interleaved flyback converters. This is because the 1–D output currents of prior art converters can vary significantly in time, limiting the benefit of interleaving. In contrast, if $D_{sec}$ is controlled precisely, both gaps and/or overlaps in combined output current can be minimized. Additionally, this arrangement minimizes peak current and RMS current in the output filter capacitors and minimizes output noise.

Figure 9:
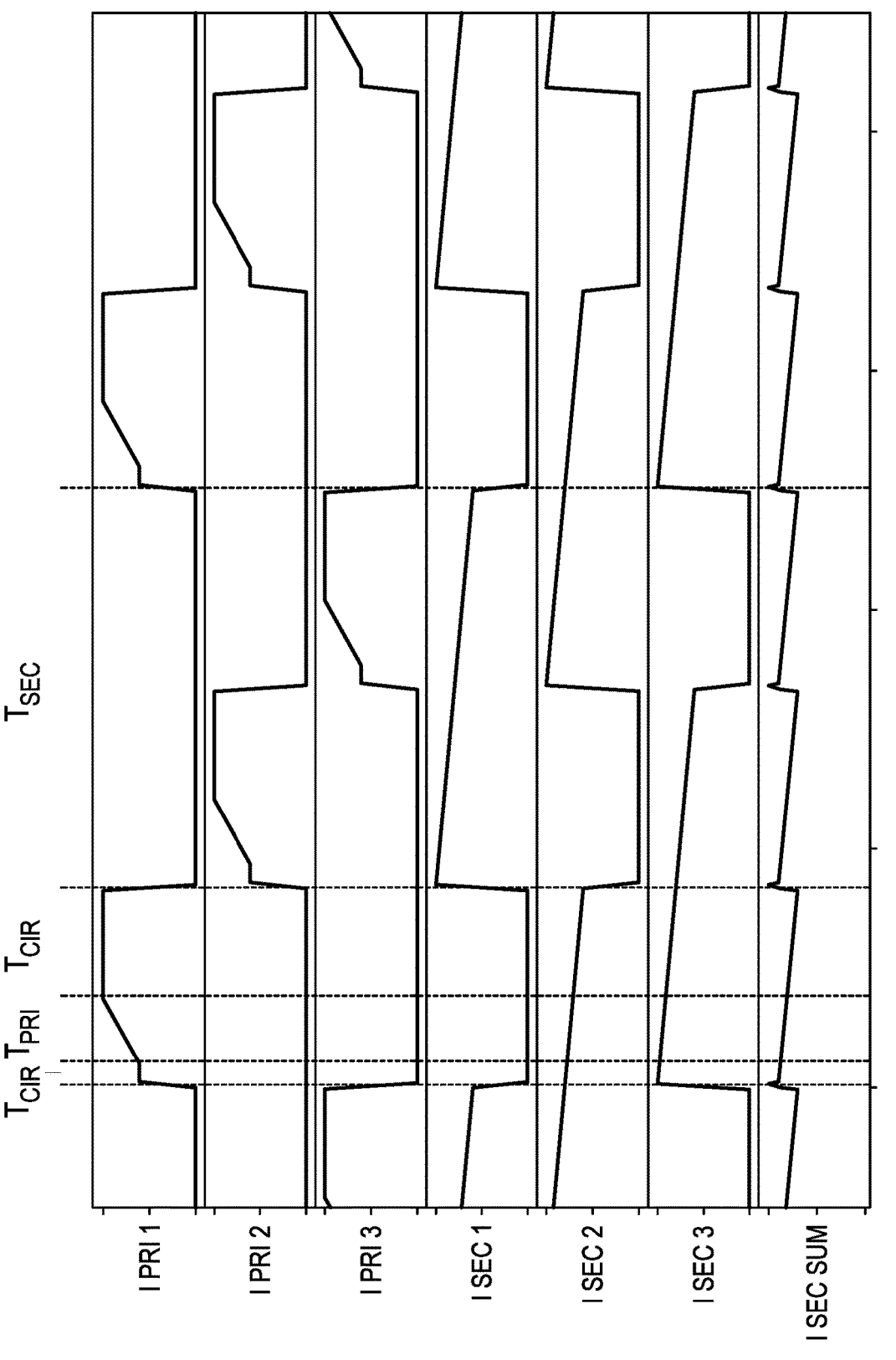
FIG. 9 depicts transformer primary and secondary output currents for a three-phase interleaved example of the multiphase power converter of FIG. 7.

Any number of interleaved phases may be employed in a similar manner. For example, primary and secondary current waveforms of a three-phase interleaved arrangement of three examples of converter 100 are shown in FIG. 9. For the three-phase interleaved example, $D_{pri}+D_{cir}=33.33\%$ and $D_{sec}=66.67\%$ in each converter, and the three converters are phased 120° apart. In this arrangement, at any given point, one converter is in $T_{pri}+T_{cir}$, with the other two in $T_{sec}$. Precise timing is used to minimize output current discontinuity and/or overlap.

Figure 10:
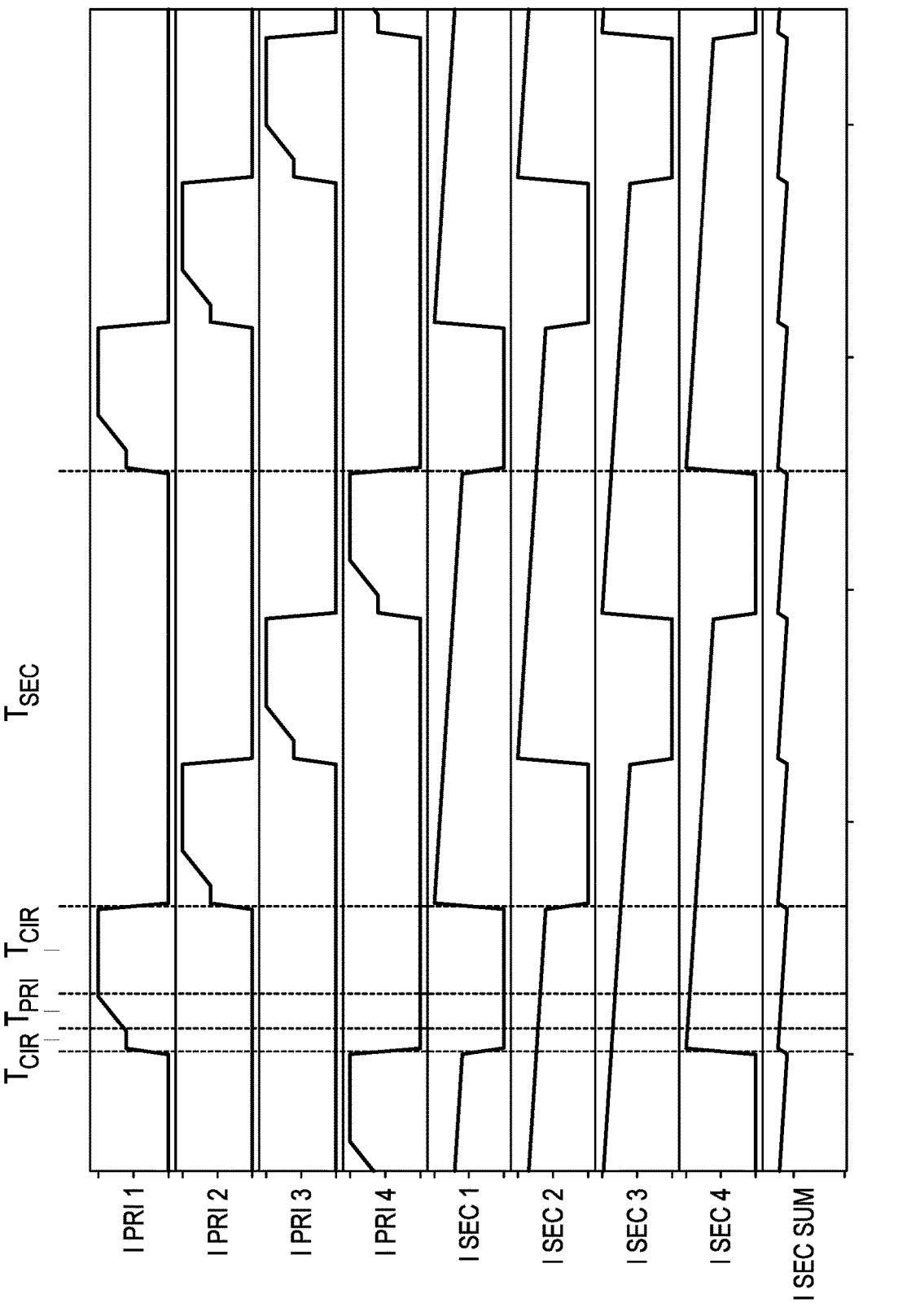
FIG. 10 depicts transformer primary and secondary output currents for a four-phase interleaved example of the multiphase power converter of FIG. 7.

Turning to FIG. 10, primary and secondary current waveforms of a four-phase interleaved arrangement of four examples of converter 100 are shown. For the four-phase example, each phase has a $D_{pri}+D_{cir}$ of 25% maximum and $D_{sec}$ is set at 75%, and the four converters are phased 90° apart. In this arrangement, during the switching cycle, one phase will operate in $T_{pri}+T_{cir}$ and the other three phases will operate in $T_{sec}$. Again, timing is adjusted to minimize discontinuity and overlap.

Interleaved converters of 5, 6, and higher phase count can likewise be implemented. Converters are equally spaced in phase, with one phase in $T_{pri}+T_{cir}$ and the rest in $T_{sec}$.

Either analog or digital control may be employed, and a variety of control methods may be utilized for controlling converter 100. However, for multiphase applications, especially involving 3 or more phases, the converters may be digitally controlled, e.g., with peak current mode control for current sharing among phases.

Since there is always output current available in interleaved converters, as discussed above, modulating $D_{sec}$ in one or more converters can provide extremely fast response to load changes, as previously described. This is particularly advantageous during output load release, where any or all phases may be immediately put into the Circulate state and output current stopped very quickly, e.g., on the order of tens of nanoseconds. Furthermore, modulating $D_{sec}$ may be employed with or without pre-bias operation. Thus, flyback converter 100 is advantageous for high current and high dynamic current applications.

B. Illustrative Combinations and Additional Examples

This section describes additional aspects and features of improved flyback converters, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A flyback converter configured to operate in a continuous mode with two primary side switches and one secondary side switch, wherein operation contains three switch states; a primary state wherein both primary side switches are on and current increases in a transformer primary, a circulate state wherein only one primary switch is on and current circulates in the transformer primary, and a secondary state wherein both primary switches are off, the secondary side switch is on, and current flows from a transformer secondary into an output of the converter.

A1. The flyback converter of paragraph A0, wherein the secondary side switch is a diode.

A2. The flyback converter of paragraph A0 or A1, wherein the order of states is rearranged.

A3. The flyback converter of any one of paragraphs A0 through A2, wherein each state may be divided into two or more substates.

A4. The flyback converter of any one of paragraphs A0 through A3, wherein either one or both of the primary state and the secondary state may be modulated, independently or in concert with each other.

A5. The flyback converter of any one of paragraphs A0 through A4, wherein a right half plane zero is eliminated in a transfer function of the flyback converter.

A6. The flyback converter of any one of paragraphs A0 through A5, wherein primary current may be pre-biased for faster response.

A7. The flyback converter of any one of paragraphs A6, wherein a level of the pre-bias current is either fixed or adjustable.

A8. The flyback converter of any one of paragraphs A0 through A7, wherein switching between primary and secondary states passes first through circulate state to reduce secondary switch voltage ring and secondary snubber losses.

A9. The flyback converter of any one of paragraphs A0 through A8, further comprises at least one other flyback converter, and wherein two or more phases of the outputs of the flyback converters are interleaved.

A10. The flyback converter of paragraph A9, wherein precise control of the various phase secondary states minimizes combined output current discontinuities and overlaps, thereby minimizing output filter noise and RMS current.

A11. The flyback converter of paragraph A9 or A10, wherein at least one phase is always in secondary state, delivering current to the output.

A12. The flyback converter of any one of paragraphs A0 through A11, wherein modulating the secondary state will increase or decrease output current in a faster manner.

B0. An electronic circuit comprising:

a flyback converter configured to operate in a continuous mode, the flyback converter including:

a coupled inductor having a primary winding and a secondary winding;

a first switch having a first input terminal, a first output terminal, and a first control terminal, wherein the first input terminal is coupled to a voltage input terminal and the first output terminal is coupled to a first end of the primary winding;

a second switch having a second input terminal, a second output terminal, and a second control terminal, wherein the second input terminal is coupled to a second end of the primary winding; and a third switch having a third input terminal, a third output terminal, and a third control terminal, wherein the third input terminal is coupled to a first end of the secondary winding.

B1. The electronic circuit of paragraph B0, wherein the coupled inductor is a transformer.

B2. The electronic circuit of paragraph B0 or B1, wherein the primary winding and the secondary winding have opposite polarities.

B3. The electronic circuit of any one of paragraphs B0 through B2, further comprising processing logic configured to automatically control the state of each of the first, second, and third switches.

B4. The electronic circuit of paragraph B3, wherein the processing logic comprises a single controller configured to control the first, second, and third switches.

B5. The electronic circuit of paragraph B3, wherein the processing logic is configured to transition the flyback converter between three different switch states, and the three switch states include:

a primary state wherein the first and second switches are on and current increases in the primary winding of the transformer;

a circulate state wherein only one of the first and second switches is on and current circulates in the primary winding of the transformer; and a secondary state wherein both the first and second switches are off, the third switch is on, and current flows from the secondary winding of the transformer into an output of the converter.

B6. The electronic circuit of paragraph B5, wherein the processing logic is configured to transition from the primary state through the circulate state to the secondary state.

B7. A power converter comprising a plurality of the circuits of paragraph B7, wherein a plurality of phases of outputs of the flyback converters are interleaved.

B8. The power converter of paragraph B7, wherein at least one phase of the plurality of phases is always in the secondary state, delivering current to the output.

B9. The electronic circuit of any one of paragraphs B0 through B8, wherein each of the first, second, and third switches comprises a respective metal oxide silicon field effect transistor (MOSFET).

B10. The electronic circuit of any one of paragraphs B0 through B9, wherein the flyback converter further includes:

a resistor-capacitor (RC) snubber including a snubber resistor and a snubber capacitor, wherein the RC snubber is coupled to first end of the secondary winding.

B11. The electronic circuit of any one of paragraphs B0 through B10, wherein the flyback converter further includes:

an output capacitor coupled to a second end of the secondary winding.

C0. A continuous-mode flyback converter, comprising:

a transformer having a primary winding and a secondary winding;

a first switch having a first input terminal, a first output terminal, and a first control terminal, wherein the first input terminal is coupled to a voltage input terminal and the first output terminal is coupled to a first end of the primary winding;

a second switch having a second input terminal, a second output terminal, and a second control terminal, wherein the second input terminal is coupled to a second end of the primary winding; and a third switch having a third input terminal, a third output terminal, and a third control terminal, wherein the third input terminal is coupled to a first end of the secondary winding.

C1. The flyback converter of paragraph C0, further comprising processing logic configured to automatically control the state of each of the first, second, and third switches.

C2. The flyback converter of paragraph C1, wherein the processing logic is configured to transition the flyback converter between three different switch states, and the three switch states include:

a primary state wherein the first and second switches are on and current increases in the primary winding of the transformer;

a circulate state wherein only one of the first and second switches is on and current circulates in the primary winding of the transformer; and a secondary state wherein both the first and second switches are off, the third switch is on, and current flows from the secondary winding of the transformer into an output of the converter.

C3. The flyback converter of any one of paragraphs C0 through C2, wherein each of the first, second, and third switches comprises a respective metal oxide silicon field effect transistor (MOSFET).

C4. The flyback converter of any one of paragraphs C0 through C3, further comprising:

a resistor-capacitor (RC) snubber including a snubber resistor and a snubber capacitor, wherein the RC snubber is coupled to first end of the secondary winding.

C5. The flyback converter of any one of paragraphs C0 through C4, further comprising:

an output capacitor coupled to a second end of the secondary winding.

D0. A method for converting a DC input voltage to a DC output voltage, the method comprising:

transitioning a continuous-mode flyback converter between three different switch states, wherein the flyback converter includes a transformer, two primary side switches, and one secondary side switch, and the three switch states include:

a primary state wherein the two primary side switches are on and current increases in a primary side of the transformer;

a circulate state wherein only one of the two primary switches is on and current circulates in the primary of the transformer; and a secondary state wherein both primary switches are off, the secondary side switch is on, and current flows from a transformer secondary into an output of the converter.

D1. The method for converting a DC input voltage to a DC output voltage of paragraph D0, the method further comprising:

interleaving a respective output of each of a plurality of the continuous-mode flyback converters of paragraph D0.

E0. A method for converting a DC input voltage to a DC output voltage, the method comprising:

increasing current in a primary side of a transformer of a flyback converter by operating the flyback converter in a primary state, wherein the flyback converter comprises two primary side switches and one secondary side switch, wherein the two primary side switches are on;

circulating current in the primary of the transformer by operating the flyback converter in a circulate state in which only one of the two primary switches is on; and flowing current from a secondary of the transformer into an output of the converter by operating the flyback circuit in a secondary state in which both primary switches are off.

ADVANTAGES, FEATURES, AND BENEFITS

The different embodiments and examples of the flyback converters described herein provide several advantages over known solutions for providing output power, such as used in power supplies or power converters. For example, illustrative embodiments and examples described herein allow for much faster response to load changes.

Additionally, and among other benefits, illustrative embodiments and examples described herein result in an output voltage proportional to $D_{pri}/D_{sec}$, rather than $D/(1-D)$, thereby eliminating the mechanism that produces the RHP zero such that the loop bandwidth can be greatly increased over existing converters.

Additionally, and among other benefits, illustrative embodiments and examples described herein are better suited for high current and/or high dynamic current applications.

Additionally, and among other benefits, illustrative embodiments and examples described herein minimize peak current and RMS current in output filter capacitors, thereby minimizing output noise.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An electronic circuit comprising:
a flyback converter configured to operate in a continuous mode, the flyback converter including:
    a coupled inductor having a primary winding and a secondary winding;
    a first switch having a first input terminal, a first output terminal, and a first control terminal, wherein the first input terminal is coupled to a voltage input terminal and the first output terminal is coupled to a first end of the primary winding;
    a second switch having a second input terminal, a second output terminal, and a second control terminal, wherein the second input terminal is coupled to a second end of the primary winding; and
    a third switch having a third input terminal, a third output terminal, and a third control terminal, wherein the third input terminal is coupled to a first end of the secondary winding;
wherein the flyback converter is configured to transition between three switch states, the three switch states including:
    a primary state wherein the first and second switches are on and current increases in the primary winding of the coupled inductor,
    a circulate state wherein exactly one of the first and second switches is on and current circulates in the primary winding of the coupled inductor, and
    a secondary state wherein both the first and second switches are off, the third switch is on, and current flows from the secondary winding of the coupled inductor into an output of the flyback converter; and
a processing logic configured to automatically control a respective state of each of the first, second, and third switches, wherein the processing logic is configured to transition the flyback converter between the three switch states, and is configured to transition from the primary state through the circulate state to the secondary state.

2. The electronic circuit of claim 1, wherein the coupled inductor is a transformer.

3. The electronic circuit of claim 1, wherein the primary winding and the secondary winding have opposite polarities.

4. The electronic circuit of claim 1, wherein the processing logic comprises a single controller configured to control the first, second, and third switches.

5. A power converter comprising a plurality of the electronic circuit of claim 1, wherein respective outputs of the flyback converters of the plurality of electronic circuit are provided in a plurality of interleaved phases.

6. The power converter of claim 5, wherein, at any given time, at least one phase of the plurality of interleaved phases is in the secondary state, delivering current to the output.

7. The electronic circuit of claim 1, wherein each of the first, second, and third switches comprises a respective metal oxide silicon field effect transistor (MOSFET).

8. The electronic circuit of claim 1, wherein the primary winding of the coupled inductor is supplied with a pre-bias current.

9. The electronic circuit of claim 1, wherein the flyback converter further includes:
    an output capacitor coupled to a second end of the secondary winding.

10. A continuous-mode flyback converter, comprising:
a transformer having a primary winding and a secondary winding;
a first switch having a first input terminal, a first output terminal, and a first control terminal, wherein the first input terminal is coupled to a voltage input terminal and the first output terminal is coupled to a first end of the primary winding;
a second switch having a second input terminal, a second output terminal, and a second control terminal, wherein the second input terminal is coupled to a second end of the primary winding;
a third switch having a third input terminal, a third output terminal, and a third control terminal, wherein the third input terminal is coupled to a first end of the secondary winding;
wherein the continuous-mode flyback converter is configured to transition between three different switch states, the three switch states including:
    a primary state wherein the first and second switches are on and current increases in the primary winding of the transformer,
    a circulate state wherein only one of the first and second switches is on and current circulates in the primary winding of the transformer, and
    a secondary state wherein both the first and second switches are off, the third switch is on, and current flows from the secondary winding of the transformer into an output of the continuous-mode flyback converter; and
a processing logic configured to automatically control a respective state of each of the first, second, and third switches, wherein the processing logic is configured to transition the flyback converter between the three switch states, and is configured to transition from the primary state through the circulate state to the secondary state.

11. The continuous-mode flyback converter of claim 10, wherein each of the first, second, and third switches comprises a respective metal oxide silicon field effect transistor (MOSFET).

12. The continuous-mode flyback converter of claim 10, further comprising:

a resistor-capacitor (RC) snubber including a snubber resistor and a snubber capacitor, wherein the RC snubber is coupled to the first end of the secondary winding.

13. The continuous-mode flyback converter of claim 10, further comprising:

an output capacitor coupled to a second end of the secondary winding.

14. A method for converting a DC input voltage to a DC output voltage, the method comprising:

transitioning a continuous-mode flyback converter between three different switch states using a processing logic, wherein the continuous-mode flyback converter includes a transformer, two primary side switches, and one secondary side switch, and the three respective switch states include:

a primary state wherein the two primary side switches are on and current increases in a primary side of the transformer;

a circulate state wherein only one of the two primary side switches is on and current circulates in the primary side of the transformer; and a secondary state wherein the two primary side switches are off, the one secondary side switch is on, and current flows from a secondary side of the transformer into an output of the continuous-mode flyback converter;

wherein the processing logic is configured to automatically control a respective state of each of the two primary side switches and the one secondary side switch, and to transition from the primary state through the circulate state to the secondary state.

15. The method for converting the DC input voltage to the DC output voltage of claim 14, the method further comprising:

interleaving a respective output of each of a plurality of the continuous-mode flyback converters of claim 14.

\* \* \* \* \*